United States Patent
Svensson et al.

(10) Patent No.: US 6,888,822 B2
(45) Date of Patent: May 3, 2005

(54) ASSOCIATION UPDATE FROM A SERVICE SUPPORT NODE TO A POOL OF MOBILE SWITCHING CENTERS

(75) Inventors: Hakan Sture Magnus Svensson, Vallda (SE); Frode Bjelland, Arendal (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 73 days.

(21) Appl. No.: 10/355,863

(22) Filed: Jan. 31, 2003

(65) Prior Publication Data

US 2003/0166402 A1 Sep. 4, 2003

(30) Foreign Application Priority Data

Feb. 9, 2002 (EP) ............................................. 02002937

(51) Int. Cl.[7] .............................. H04L 12/66; H04Q 7/20
(52) U.S. Cl. ........................ 370/353; 370/355; 455/433
(58) Field of Search ................................ 370/352, 356, 370/353, 355; 455/445, 552.1, 560, 432.3, 444, 432.1, 433

(56) References Cited

U.S. PATENT DOCUMENTS

| 6,091,953 | A | * | 7/2000 | Ho et al. ..................... 455/433 |
| 6,097,951 | A | * | 8/2000 | Ernam et al. ............... 455/433 |
| 6,628,645 | B2 | * | 9/2003 | Scheurich ................... 370/353 |
| 2003/0028644 | A1 | * | 2/2003 | Maguire et al. ............ 709/226 |
| 2003/0129991 | A1 | * | 7/2003 | Allison et al. .............. 455/456 |

* cited by examiner

*Primary Examiner*—Duc Ho
*Assistant Examiner*—Lee Khuong

(57) ABSTRACT

The invention relates to an update of an association (Gs) from a serving GPRS support node (SGSN) to a mobile switching center (MSC1, . . . , MSCn) in a pool (12) of mobile switching centers. After receipt of a routing area update from a mobile station (MS), there follows a detection of a new assignment between the mobile unit (MS) to a mobile switching center (MSC) in the pool (12) of mobile switching centers. After detection of a new assignment, there follows the initialization of an association update from a serving GPRS support node to a new mobile switching center in the pool of mobile switching centers (12).

12 Claims, 7 Drawing Sheets

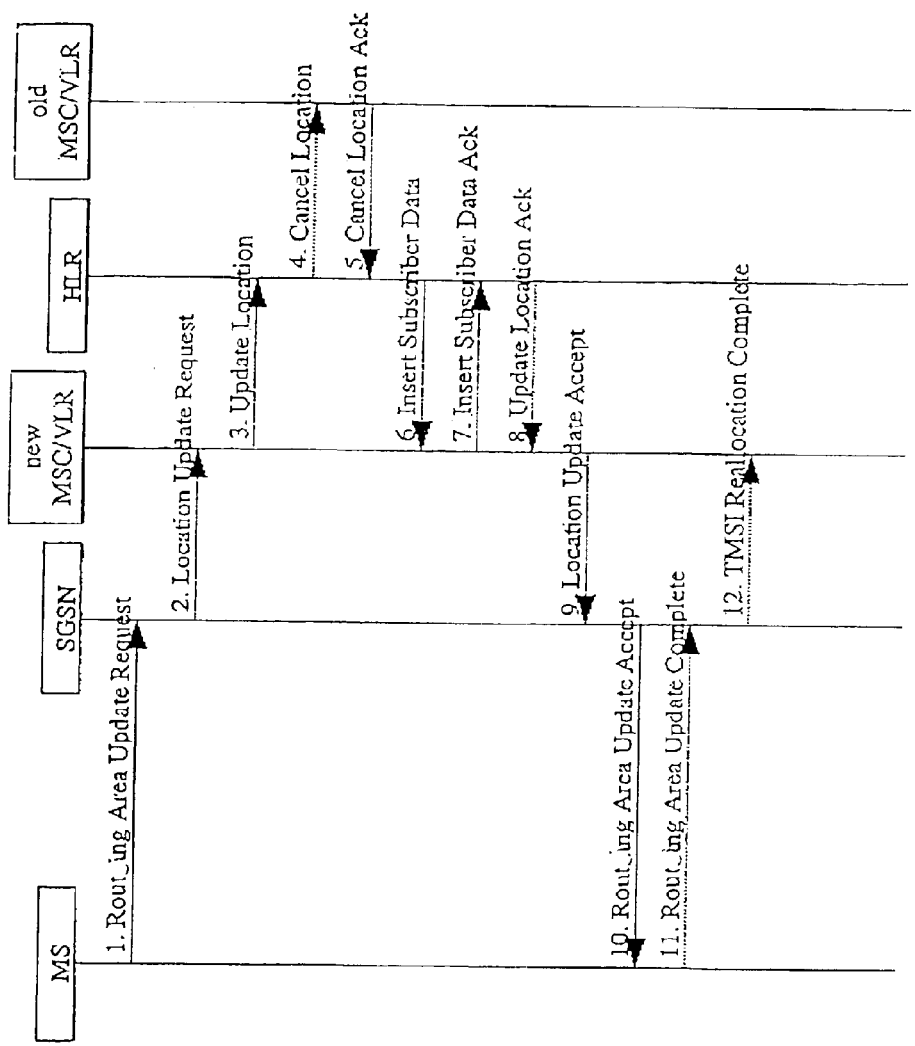

ASSOCIATION UPDATE FROM A SERVICE SUPPORT NODE TO A POOL OF MOBILE SWITCHING CENTERS

CROSS-REFERENCE TO RELATED APPLICATIONS

This application claims the benefit of the filing date as provided by 35 U.S.C. 119 of European patent number 02002937-7 filed on Feb. 9, 2002, the disclosure of which is incorporated herein by reference.

FIELD OF INVENTION

The present invention relates to a method and apparatus for updating an association for a mobile unit from a service support node to a pool of mobile switching centers.

BACKGROUND OF INVENTION

Established mobile communication systems rely on an architecture having a core network and a radio access network. One such typical example is the GSM mobile communication network where the core network comprises at least one gateway mobile services switching center GMSC, mobile switching center MSC, home location register HLR, and visitor location registers VLR. The gateway mobile services switching center GMSC is connected to a plurality of mobile switching centers MSC. Usually, each mobile switching center MSC is connected to a visitor location register VLR. Different visitor location registers VLR are connected to a home location register HLR, which is also linked to the gateway mobile services switching center GMSC.

With respect to the radio access network, each mobile switching center MSC serves a plurality of base station controllers BSC being connected to a plurality of base transceiver stations BTS for link establishment to mobile stations MS roaming in the area covered by the mobile communication network.

While such an architecture for mobile communication systems is well suited to support circuit switched services, general packet radio service GPRS has been introduced by the European Telecommunication Standards Institute ETSI to also support packet switched services for roaming subscribers.

Contrary to the circuit switched mobile communication network, the packet switched GPRS network is adapted to offer connection to a standard data network using protocols such as TCP/IP. Heretofore, for the architecture of the packet switched mobile communication network new functional elements are introduced.

With GPRS mobile communication systems the intra operator structure consists of support nodes, i.e. the gateway GPRS support nodes GGSN and the serving GPRS support nodes SGSN. The main function of the gateway GPRS support node GGSN is the interaction with the external data network and the update of a location directory using routing information supplied by the serving GPRS support nodes SGSN for a roaming mobile subscriber.

While the circuit switched mobile communication network—e.g., according to GSM or UMTS—and the packet switched mobile communication network—e.g., the general packet radio service GPRS—logically are operated independent from each other, nevertheless, they use resources in common to a certain extent, in particular on the signaling level.

For exchange of signaling information the serving GPRS support node has direct access to the radio access network via the Gb interface for GSM and via the Iu for UMTS. Further, for exchange of information between the serving GPRS support node and the mobile switching center MSC/visitor location register VLR there is established a Gs interface. Still further, interface Gr allows to exchange information between the serving GPRS support node and the home location register HLR.

While the architecture described so far works well when there is established a 1:n relationship between each mobile switching center MSC and related base station controllers BSC, the architectures outlined above are not suitable when each base station controller may be served by a plurality of mobile station centers MSC to increase network capacity and reliability, i.e. when a plurality of mobile station centers MCS are integrated into a pool of mobile station centers MSC.

Today, there is no satisfactory proposal for a simultaneous operation of packet switched mobile communication networks in combination with circuit switched mobile communication systems when a pool of mobile switching centers MSC is provided in the circuit switched mobile cellular communication system. The reason for this is that there is no solution to the problem of re-distributing subscribers between mobile switching centers MSC in a related pool when packet switched services are used, except waiting for the subscribers to turn off and on their mobile station or to move to a new location area in the circuit switched mobile communication system. Since this can take a long time, it severely reduces the benefits of a mobile switching center MSC pool.

SUMMARY OF INVENTION

In view of the above, a first object of the present invention is to achieve a fast update of an association for a mobile unit from a service support node in packet switched mobile communication systems to a related mobile switching center in a pool of mobile switching centers operated in a circuit switched mobile communication system.

Further, a second object of the present invention is to avoid any loss of ongoing circuit switched services during such an association update.

According to the present invention, theses objects are achieved through a method of updating an association from a service support node supporting packet switched services to a mobile switching center in a pool of mobile switching centers supporting circuit switched services, comprising the steps of receiving a routing area update at the service support node from a mobile unit being supported by the service support node, detecting a new assignment of the mobile unit to a mobile switching center in the pool of mobile switching centers after receipt of the routing area update, and initiating an association update from the service support node to the mobile switching center assigned to the mobile unit after receipt of the routing area update.

Therefore, according to the present invention it is proposed to repeatedly detect whether an assignment from a mobile unit to a mobile switching center in the pool of mobile switching centers has changed. In the affirmative case there follows an update of the association of the service support node operated in the packet switched mobile communication network.

One typical example of such an assignment of a mobile unit to a single mobile switching center in the pool may be, without restricting the scope of the invention, a mapping of a parameter being unique for the mobile unit to the mobile switching center in the pool, e.g., the international mobile equipment identity IMEI or the international mobile subscriber identity IMSI according to GSM.

According to the present invention it is also proposed to realize the association update from the old to the new mobile switching center in the pool triggered by signaling information exchange in the packet switched mobile communication network, in particular the receipt of a routing area update at the service support node from a mobile unit being supported by this service support node.

A first example for sending a routing area update by the mobile unit is the roaming of the mobile unit from one routing area supported by the service support node to another routing area also supported by the same service support node.

A second example for sending a routing area update relates to a case where the mobile unit remains within the same location area, nevertheless initiates routing area updates to indicate to the service support node that it remains in a stand-by state for immediate transfer to an active state when packet data is to be exchanged between the mobile unit and the service support node. Typically, however, without restricting the invention, such routing area updates initiated during the stand-by state of the mobile unit may be periodic routing area updates.

The present invention as outlined above is particularly well suited to so-called mode 1 mobile communication networks, where signaling between the mobile unit and both the circuit switched and the packet switched mobile communication core network is exchanged via the service support node.

The continuous update of the association from the service support node to the appropriate mobile switching center within the pool of mobile switching centers of the circuit switched mobile communication network has a severe impact on the availability of service also in the packet switched domain for the mobile unit. One such example would be that without such an update and assuming that a mobile switching center in the pool is taken out of service without appropriate association update to the new mobile switching center in the pool, then the mobile unit could no longer receive circuit switched services until the next location update in the circuit switched mobile communication network or until the subscriber turns the mobile unit on again.

Another important advantage of the present invention being related to the network operation mode 1 outlined above is the minimized amount of signaling over the radio link and thus the efficient use of scarce bandwidth on the radio link. Further, the efficient use of bandwidth also minimizes the risk of losing ongoing circuit switched services.

According to a preferred embodiment of the present invention, it is proposed to detect ongoing circuit switched services for the mobile unit after receipt of the routing area update and then to delay the association update from the service support node to the new mobile switching center in the pool during such ongoing services.

This preferred embodiment of the present invention avoids an interruption of circuit switched services during association update for the service support node. It should be noted that the delay of association update may be freely selected within the framework of the present invention, e.g., it may be delayed to the subsequent receipt of routing area update or even further.

According to a preferred embodiment of the present invention the detection of ongoing circuit switched services for the mobile unit relies on querying the mobile switching center assigned to the mobile unit before receipt of the routing area update. Here, the advantage is that existing infrastructure must not be changed as the information to which mobile switching center in the pool the mobile unit is assigned is easily available both in the circuit and packet switched mobile communication network.

According to another preferred embodiment of the present invention, the detection of ongoing services relies on evaluating a parameter in a routing area message indicating ongoing circuit switched services for the mobile unit.

While this preferred embodiment requires a change of the routing area update message format, it allows to minimize signaling efforts as no query of a mobile switching center in the pool of mobile switching centers is necessary. To the contrary, it is the mobile unit itself that indicates to the service support node whether a circuit switched service is ongoing for the mobile unit or in other words whether the association update from the service support node to a mobile switching center pool should be delayed.

A further preferred embodiment of the present invention relates to the detection of an assignment of the mobile unit to a mobile switching center in the pool of the mobile switching centers, in more detail to the determination of the old and new mobile switching center.

A first solution is to have a unique identification of the mobile unit and use a mapping of this unique identification to a mobile switching center in the pool of the mobile switching centers according to a pre-specified algorithm.

Therefore, this preferred embodiment relies on a mapping of the unique identification to the mobile switching center in the pool which is reconstructable at any time using the pre-specified algorithm. Important to note that the type of unique identification may not restrict the scope of the present invention and that any type of such a unique identification is applicable.

According to a preferred embodiment, the pre-specified algorithm maps the unique identification of the mobile unit into an index for access to a table storing a relation between the index and a mobile switching center in the pool of mobile switching centers providing services to the mobile unit.

Therefore, it is proposed to use haching for processing of the unique identification of the mobile unit. The haching value or index is then used to access the table storing a relation between the index and the mobile switching center in the pool activated for the mobile unit.

It should be noted that due to ongoing changes in the assignment between mobile units roaming in the circuit switched mobile communication network and the mobile switching centers in the pool serving these mobile units, the table will change over time and therefore the same index may lead to different mobile switching centers at different points in time according to a re-assignment of mobile units to the mobile switching centers in the pool.

Also the pre-specified algorithm may change over time.

According to a further preferred embodiment, it is proposed to store the assignment of the mobile unit to a mobile switching center in the pool of mobile switching centers after receipt of the routing area update in the service support node for subsequent detection of a new assignment for the mobile unit. In other words, this preferred embodiment used a history mechanism tracking the different assignments at different points in time.

Clearly, the availability of information allows to minimize again signaling between the packet switched area and the circuit switched area which would otherwise be necessary to determine the assignment of the service support node to a mobile switching center in the pool of mobile switching centers at different points in time.

The present invention as outlined above with respect to method steps clearly is not restricted to a particular type of circuit switched or packet switched mobile communication network and may easily be applied to different types of these networks, e.g., GSM or UMTS.

Further, different advantages as explained above are also achieved by the service support node supporting packet switched services and being associated with a mobile switching center in a pool of mobile switching centers supporting circuit switched services as outlined in the different apparatus claims.

Still further, the present invention relates to a computer program for controlling a service support node in a way that the service support node performs the inventive method steps.

Also, according to the present invention there is provided a computer program product directly loadable into the internal memory of a service support node supporting packet switched services for a mobile station roaming in a digital mobile communication network comprising software code portions for performing the inventive method of initializing an association update from a service support node supporting packet switched services to a mobile switching center in a pool of mobile switching centers supporting circuit switched services when the product is run on a processor of the service support node supporting packet switched services.

Therefore, the present invention is also provided to achieve an implementation of the inventive method steps on computer or processor systems. In conclusion, such implementation leads to the provision of computer program products for use with a computer system or more specifically a processor comprised in, e.g., a service support node supporting packet switched services.

These programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or telephone networks and/or the internet via modems or other interface devices. It should be understood that such media, when carrying processor readable instructions implementing the inventive concept represent alternate embodiments of the present invention.

DESCRIPTION OF DRAWINGS

The best mode and preferred embodiments of the present invention will be described in the following with reference to the drawing in which:

FIG. 7 illustrates a change of serving GPRS support node association at periodic routing area updates when the mobile unit indicates an ongoing circuit switched service.

DETAILED DESCRIPTION

In the following, the best mode of carrying out the present invention as well as preferred embodiments will be described with respect to the Figures. As already outlined above, the concepts outlined in the following are not restricted to a particular type of circuit switched or packet switched mobile communication and may be applied, e.g., to GSM or UMTS. Further, without restricting the scope of the present invention, in the following packet switched mobile network systems will be discussed with reference to the general packet radio service GPRS as standardized by the European Telecommunication Standards Institute ETSI.

The present invention as explained in the following is particularly well suited for so-called mode 1 mobile communication networks where the Gs interface according to GPRS is present and at least part of the signaling between a mobile station MS and the circuit switched and the packet switched mobile communication core network is exchanged via the servicing GPRS support node. Preferably, the mobile stations MS are class A mobile stations supporting both packet-switched and circuit-switched services.

The term association used in the following is to be understood as a relation between a serving GPRS support node in a packet-switched mobile communication system and a mobile switching center MSC in the pool of mobile switching centers in a circuit-switched mobile communication system. This relation is established via a Gs interface for exchange of signaling information with respect to a mobile station MS.

During operation of a packet-switched mobile communication network in combination with a circuit-switched mobile communication network an exchange of signaling information—e.g., downlink paging of a mobile station MS—is also achieved directly between the mobile station MS and a mobile switching center MSC. Each relation established between the mobile station MS and a mobile switching center MSC—e.g., in a pool of mobile switching centers—will be referred to as assignment between the mobile station MS and the mobile switching center MSC in the following.

With respect to the operation of the packet-switched network and a mobile station roaming therein, one should node that the service area of each serving GPRS support node is divided into routing areas. During operation, a mobile station MS in the service area of a serving GPRS support node will submit routing area updates to a serving GPRS support node when roaming from one routing area to another. These routing area updates will also be referred to as regular routing area updates in the following. The mobile station MS will also submit routing area updates to a serving GPRS support node SGSN during stay in a single routing area for indication, e.g., of a stand-by state of the mobile station with respect to packet-switched services. This type of routing area may, e.g., be submitted periodically.

Figure 1:
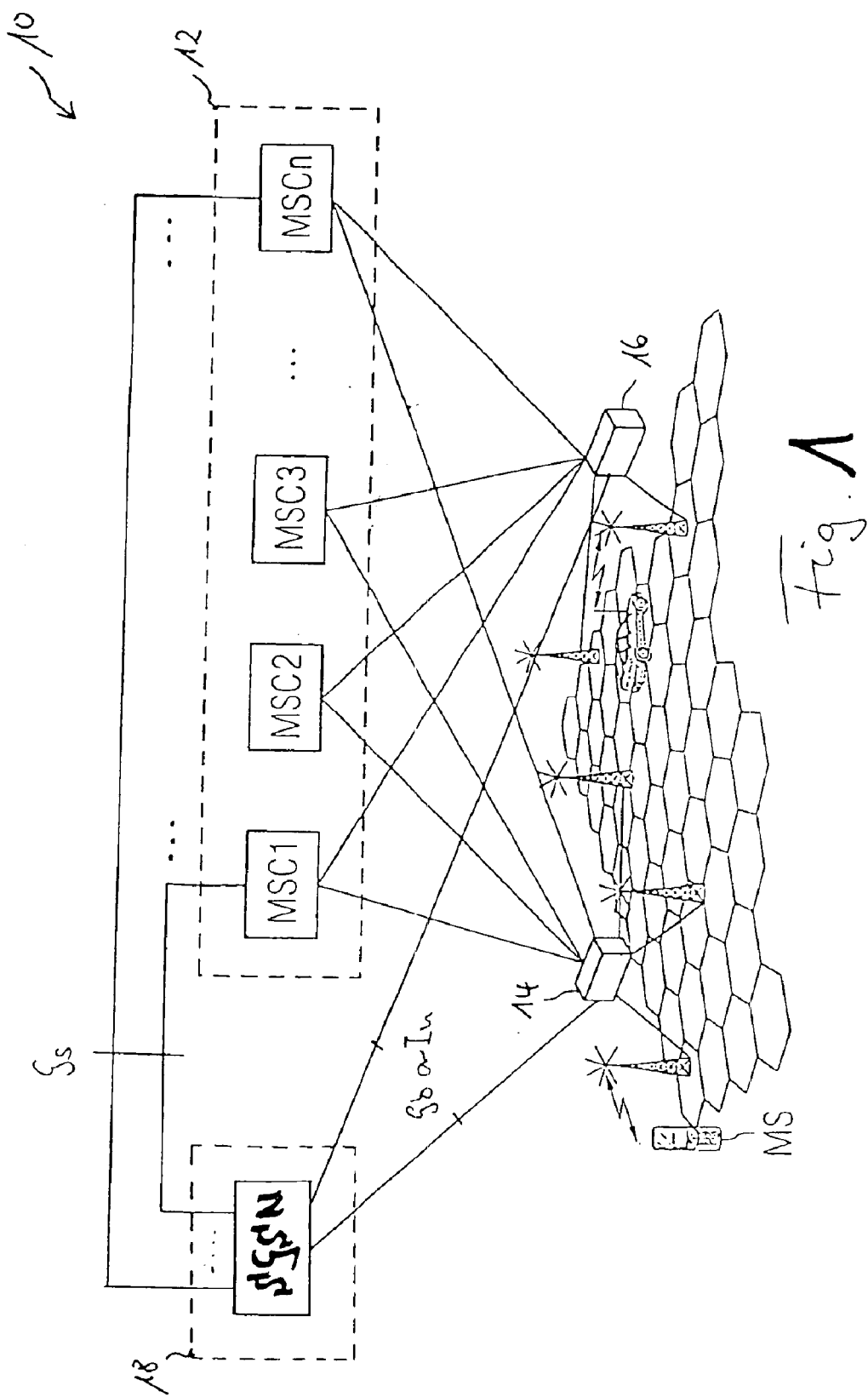
FIG. 1 illustrates an association from a serving GPRS support node to a mobile switching center in a pool of mobile switching centers according to the present invention.

FIG. 1 gives an overview on an operation of a packet-switched mobile communication network in combination with a circuit-switched mobile communication network where the present application may be applied.

As shown in FIG. 1, in the circuit switched mobile communication network 10 comprises a pool of mobile switching centers 12 with a plurality of different mobile switching centers MSC1, MSC2, MSC3, . . . , MSCn. Each radio access node 14, 16 may select either one of the mobile switching centers MSC1, MSC2, MSC3, . . . , MSCn in the pool of mobile switching centers 12 for the purpose of radio access to, e.g., a mobile station MS.

Which specific mobile switching center MSC1, MSC2, MSC3, . . . , MSCn in the pool of mobile switching centers 12 will actually be selected depends on circumstances like load on each mobile switching center MSC1, MSC2, MSC3, . . . , MSCn, availability of each mobile switching center MSC1, MSC2, MSC3, . . . , MSCn, roaming of the mobile station MS, etc. Details thereof are beyond the scope of the present invention and will therefore not be explained here.

For the present invention it is relevant to note that each mobile station MS is assigned to only one mobile switching center MSC1, MSC2, MSC3, . . . , MSCn in the pool at a point in time and that the assignment may change over time.

A first reason for change of assignment is that a mobile station is turned on by the subscriber and therefore signaling data is exchanged with the core network, i.e. the pool of mobile switching centers.

A second reason for a change of assignment could be that one of the mobile switching centers in the pool of mobile switching centers 12 goes out of operation, e.g., for maintenance reasons.

A third reason for change of assignment could be the application of load sharing algorithms in the pool of mobile switching centers 12.

A fourth reason could be the roaming of a subscriber.

With respect to the packet-switched side the serving GPRS support node SGSN 18 shown in FIG. 1 is to be considered.

As shown in FIG. 1, the serving GPRS support node has direct access to the radio access nodes 14, 16 via the interfaces Gb for GSM or Iu for UMTS and may establish a relation to each mobile switching center MSC1, MSC2, MSC3, . . . , MSCn in the pool of mobile switching centers 12 for association establishment via the signaling interface Gs. As already outlined above, this signaling interface Gs is used to built up an association for a mobile station MS from a serving GPRS support node to a mobile switching center MSC1, MSC2, MSC3, . . . , MSCn in the pool of mobile switching centers 12.

A first reason for an association update may be a mobile station attach. The mobile station attach may either be a combined attach for circuit- and packet-switched services or an attach for packet-switched services when an attach for circuit-switched services has already occurred. In both cases, the serving GPRS support node will send a location update request to a mobile switching center in the pool of mobile switching centers 12.

A further reason for an association update may be a routing area update forwarded through the serving GPRS support node SGSN, e.g., when the mobile station MS roams between different routing areas in the packet switched domain or indicates its stand-by state.

While FIG. 1 shows a single serving GPRS support node in association with a pool of mobile switching centers 12, according to the present invention also a plurality of serving GPRS support nodes as pool of serving GPRS support nodes may establish an association for a mobile station MS to a pool of mobile switching centers.

Figure 2:
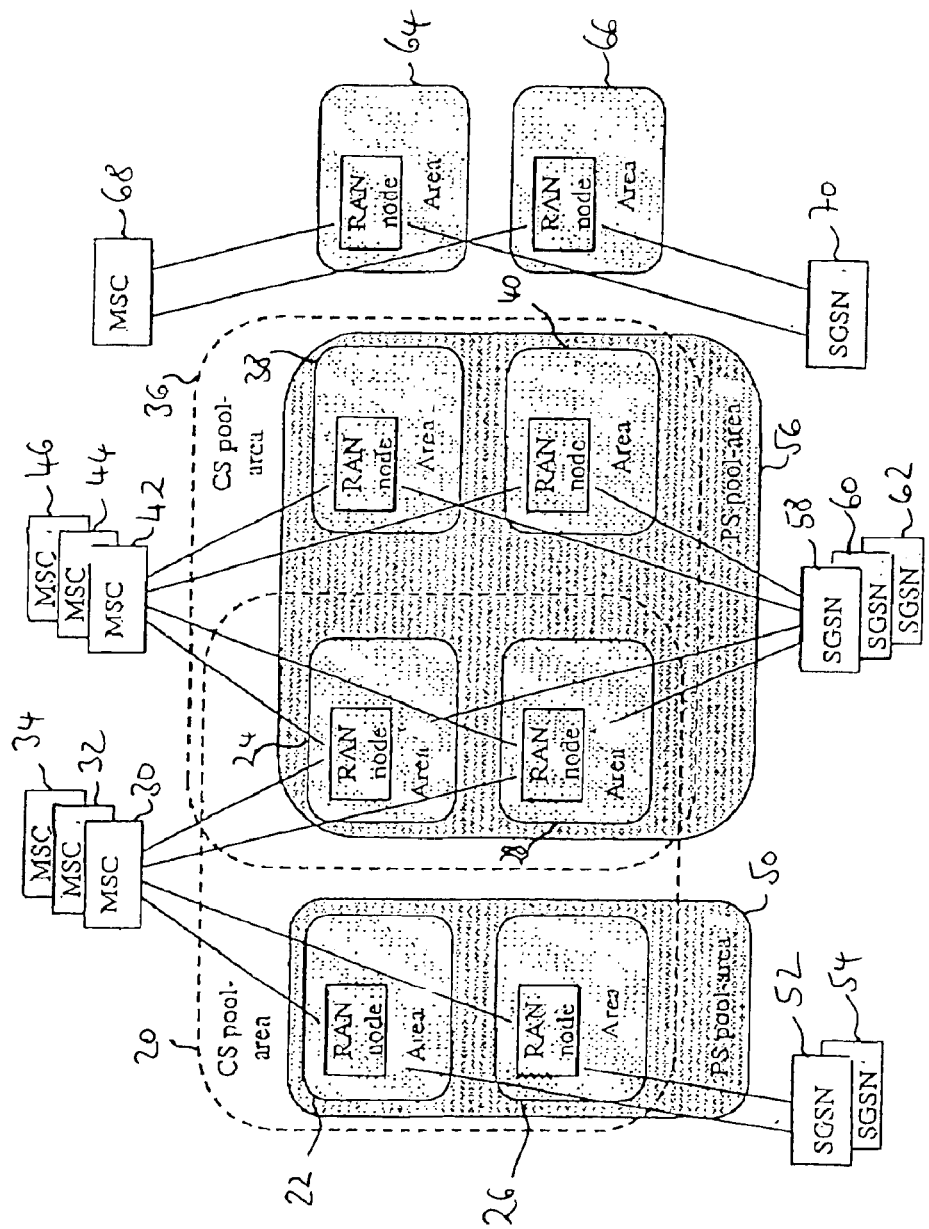
FIG. 2 illustrates different application scenarios for the association update according to the present invention.

As shown in FIG. 2, the pool concept enables mobile switching center MSC or serving GPRS support node service areas as a collection of a plurality of different radio access node service areas. In difference to a single mobile switching center or serving GPRS support node SGSN service area, a pool area is supported by a plurality of mobile switching centers MSC or serving GPRS support nodes SGSN in parallel.

As shown in FIG. 2, a pool area configuration suitable for the application of the present invention may comprise a circuit switched pool area 20 covering a radio access node area 22, a radio access node area 24, a radio access node area 26, and a radio access node area 28, served by a mobile switching center MSCs 30, a mobile switching center 32, and a mobile switching center 34.

As also shown in FIG. 2, the pool area configuration also comprises a circuit switched pool area 36 covering the radio access node area 24, a radio access node area 38, the radio access node area 28, and a radio access node area 40 served by a mobile switching center 42, a mobile switching center 44, and a mobile switching center 46.

As also shown in FIG. 2, a packet switched pool area 50 covers the radio access node area 22 and the radio access node area 26 and is served by a serving GPRS support node 52 and a serving GPRS support node 54.

As also shown in FIG. 2, a packet switched pool area 56 covers the radio access node area 24, the radio access node area 38, the radio access node area 28, and the radio access node area 40 and is served by a serving GPRS support node 58, a serving GPRS support node 60, and a serving GPRS support node 62.

As also shown in FIG. 2, a radio access node areas 64 and a radio access node areas 66 are a served by mobile switching center 68 and a serving GPRS support node 70 without any pooling.

The possibility to configure overlapping pool areas is shown by the circuit switched pool areas 20 and 36. The packet switched pool areas 50 and 56 are configured non-overlapping.

The pool areas of the circuit switched and packet switched domain may be configured identical as circuit switched pool area 36 and packet switched pool area 56, or they may be configured differently as shown by circuit switched pool area 20 and packet switched pool area 50.

While above aspects of a combined operation of a packet-switched network and a circuit-switched networks and related pooling concepts have been explained, in the following the application of the association update according to the present invention thereto will be explained with respect to FIGS. 3 to 7.

Figure 3:
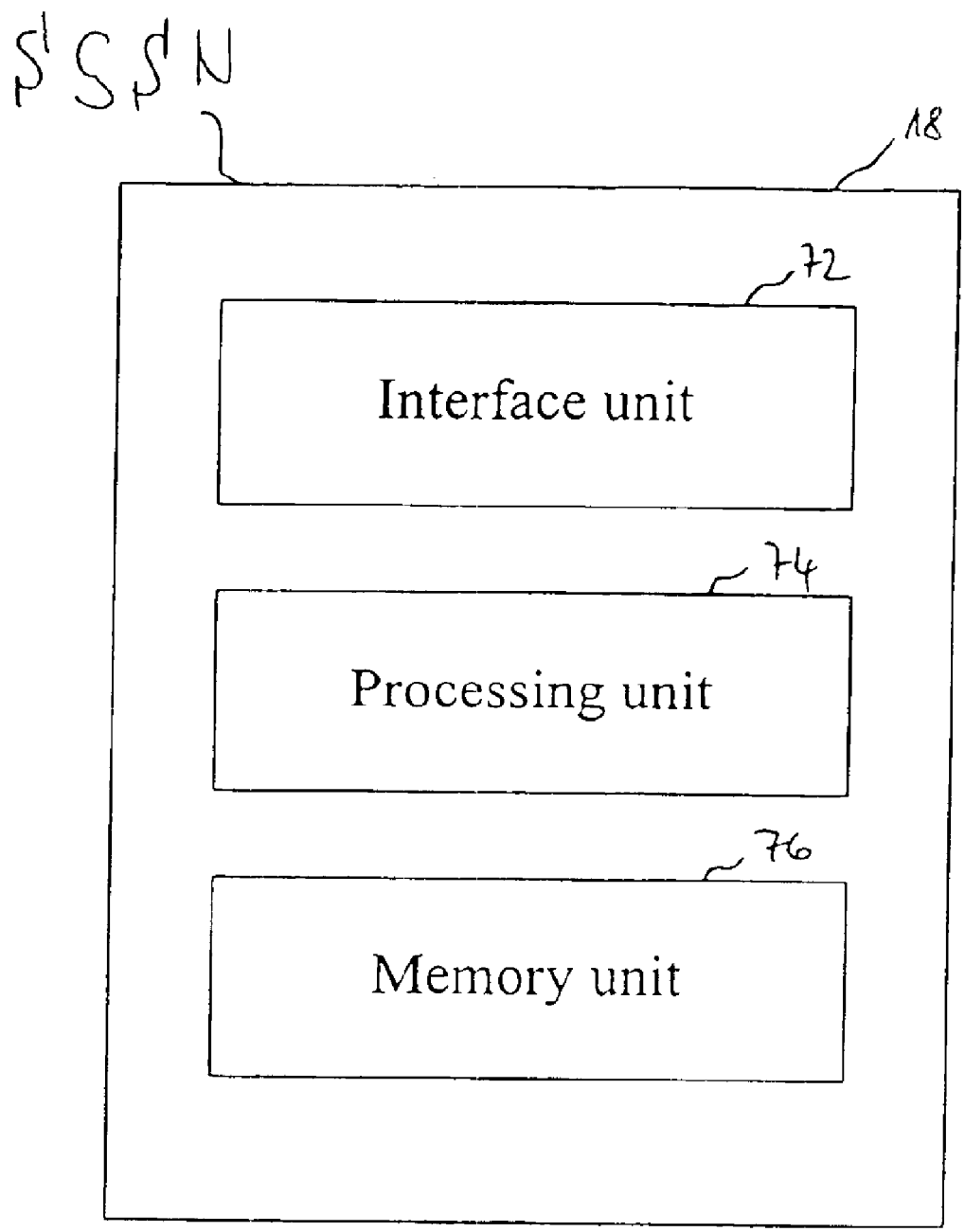
FIG. 3 illustrates a schematic diagram of a serving GPRS support node according to the present invention.

FIG. 3 shows a schematic diagram of a serving GPRS support node supporting the association update according to the present invention.

As shown in FIG. 3, the serving GPRS support node according to the present invention comprises an interface unit 72, a processing unit 74, and a memory unit 76.

Operatively, the interface unit 72 is adapted to handle the Gb signaling traffic for GSM, the Iu signaling traffic for UMTS, and Gs interface signaling traffic illustrated in FIG. 1.

Further, the memory unit 76 is adapted to store, e.g., an assignment of a mobile station MS to one of the mobile switching centers in the pool of mobile switching centers and further information necessary for the association update explained in more detail in the following.

The processing unit 74 is adapted to carry out the method of updating an association from the serving GPRS support node to mobile switching centers in the pool of mobile switching centers.

Figure 4:
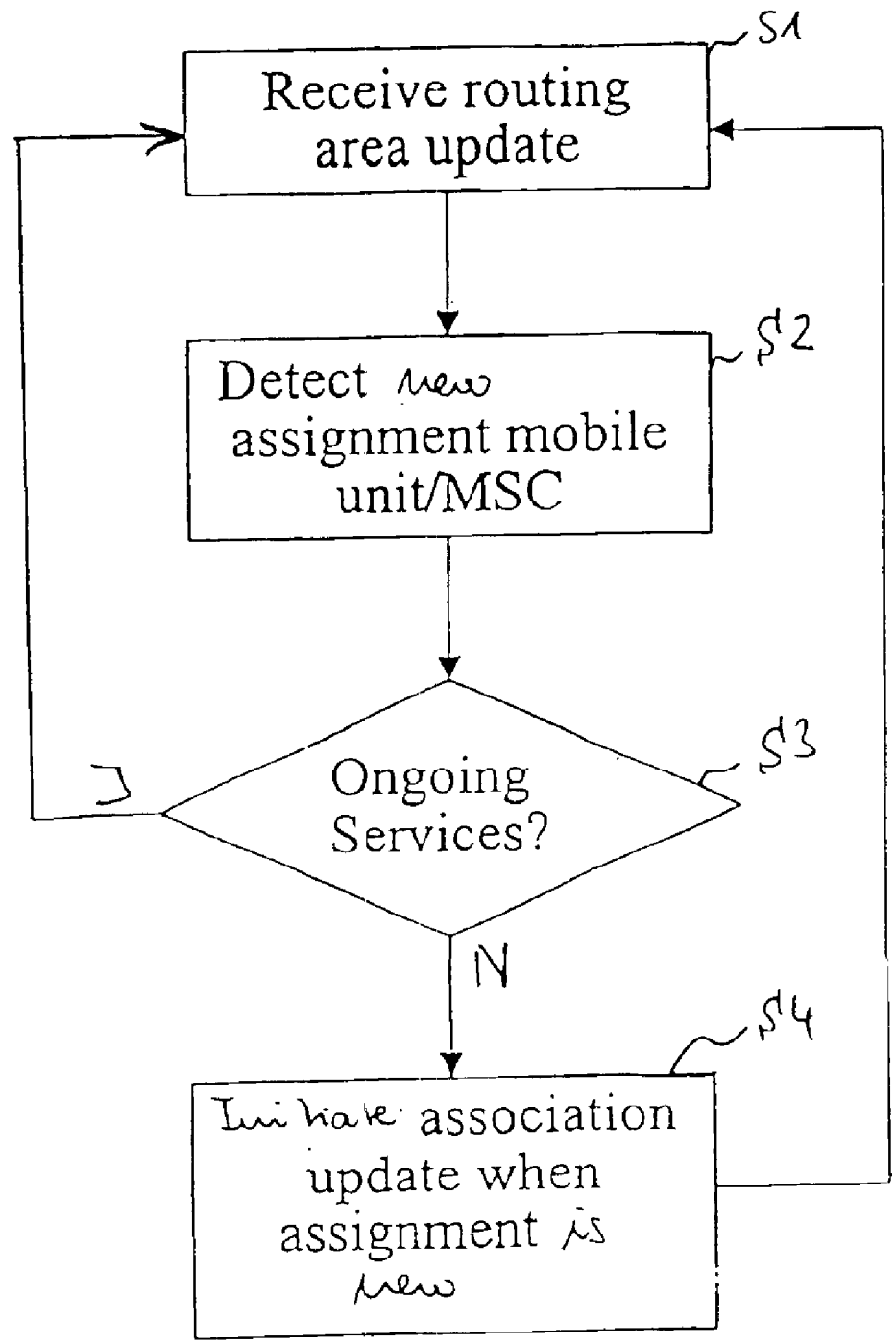
FIG. 4 illustrates a method of updating an association from a serving GPRS support node to a mobile switching center in a pool according to the present invention.

This method is illustrated in more detail in the flowchart shown in FIG. 4.

As shown in FIG. 4, association update according to the present invention is related to receipt of routing area updates at the serving GPRS support node in step S1. Different reasons, why such a routing area update is submitted to the serving GPRS support node have already been explained above and will not be repeated here.

As shown in FIG. 4, after receipt of a routing area update, the processing unit 74 of the serving GPRS support node 18 detects whether there exists a new assignment between the mobile unit and a mobile switching center in the pool of mobile switching centers 12 in step S2.

The detection step S2 shown in FIG. 4 be explained in more detail with respect to FIG. 5 in the following.

Figure 5:
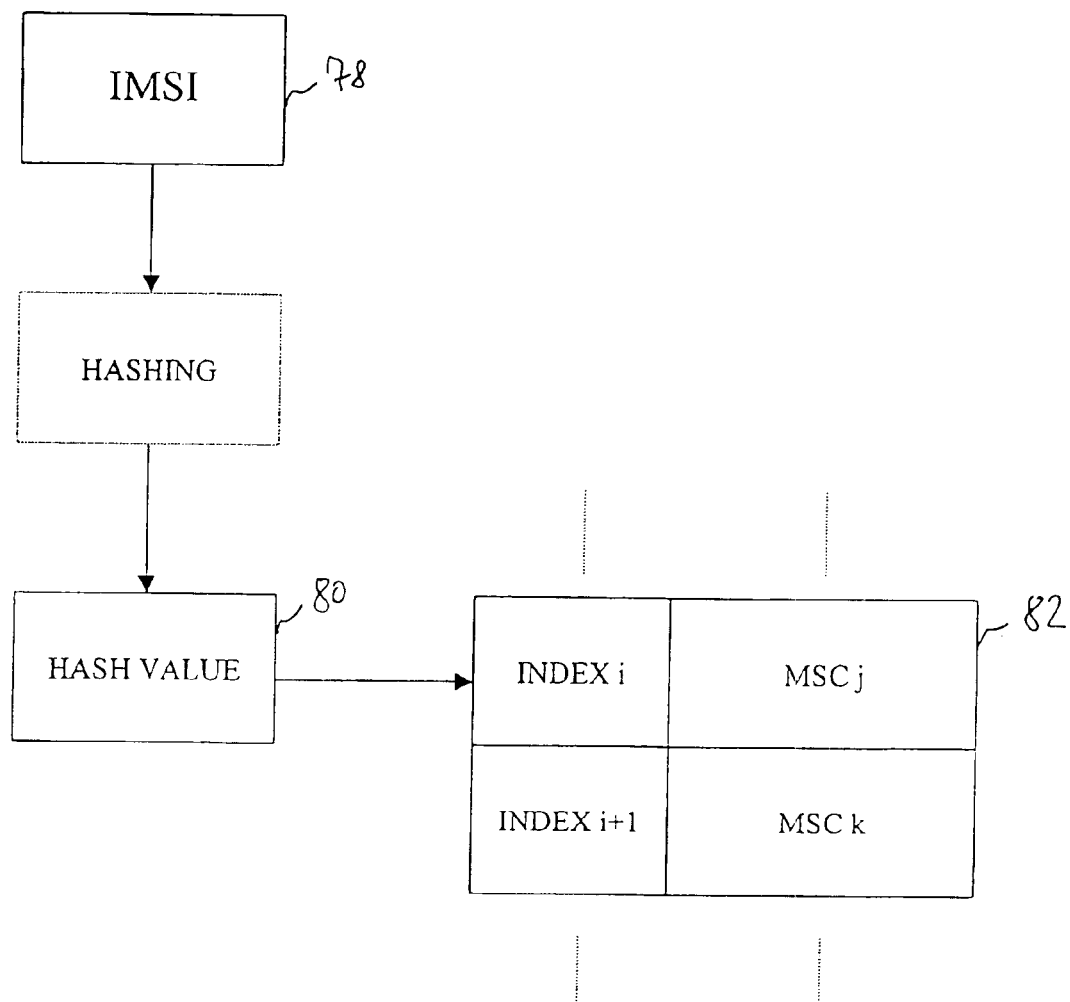
FIG. 5 is a schematic diagram illustrating the mapping of a unique identification of the mobile unit into an index for access to a table storing a relation between the index and a mobile switching center in the pool according to the present invention.

As shown in FIG. 5, one option is to use a unique identification 78 of the mobile station such as the international mobile station identification IMSI or the international mobile equipment identification IMEI (not shown in FIG. 5) and then use a haching to map this unique identification of the mobile station into a hache value 80.

The hache value will then be used as index for access to a table 82 that stores a relation between the index and at least one mobile switching center providing circuit switched services for the mobile station MS.

The table 82 shown in FIG. 5 may change over time with a change of assignment between mobile station(s) MS and the mobile switching centers in the pool of mobile switching centers 12.

While above reference has been made to a haching mechanism for identification of an assignment between a mobile station MS and a mobile switching station MSCi in the pool of mobile switching centers 12, generally, according to the present invention any pre-specified algorithm enabling the identification of such an assignment is well within the scope of the present invention. Further, this algorithm may change over time.

Also, it is preferable that once such an assignment between a mobile station MS and a mobile switching center in the pool of mobile switching centers it is detected, this assignment is stored in the memory unit 76 of the serving GPRS support node 18 for subsequent detection of a new assignment.

Further, while above reference is made to the international mobile station identification IMSI or the international mobile equipment identification IMEI for deriving the assignment between the mobile station MS and a mobile switching center in the pool of mobile switching centers, it is also possible to use only part of this unique identification to achieve the same functionality, e.g., some of the less significant digits therefrom.

Referring again the FIG. 4, step S3 follows the detection of a new assignment from a mobile station to a mobile switching center MSC. The step S3 relates to the detection of ongoing circuit switched services for the mobile station MS.

A first way to execute this step S3 is querying the mobile switching center assigned to the mobile station MS when receiving the routing area update.

A second way to execute this step S3 is evaluating a parameter indicating ongoing circuit switched services in the routing area update message when this parameter is available. This alternative would require a modification of the mobile station MS and the signaling message format so that the mobile station MS may set this parameter in the routing area update message properly.

Irrespective of how step S3 is executed, when the mobile station MS receives ongoing circuit switched services, these circuit switched services should not be interrupted.

For this reason the process shown in FIG. 4 branches back to step S1 for receiving a further routing area update. Therefore, the initialization of an association update will be delayed until receipt of a further routing area update.

It should be understood that this is only one example for delay of association update, and that the delay of association update may be achieved, e.g., through waiting for a plurality of routing area updates or through waiting for a pre-specified time before initializing the association update.

If the answer to the interrogation in step S3 is no, the process shown in FIG. 4 will proceed to the initialization of an association update in step S4 when the association between a mobile unit MS and a mobile switching center in the pool of mobile switching centers is new.

With respect to the flowchart shown in FIG. 4, it should be noted that the step S3 for detecting ongoing circuit switched services for the mobile station MS is optional and may be omitted therefrom. In this case, when a new association between the mobile station MS and a mobile switching center in the pool of mobile switching centers is detected, the method would then immediately proceed to initiate an association update in step S4 irrespective of whether circuit switched services are going on for the mobile station MS or not.

In the following more detailed examples for the inventive association update methodology will be given with respect to FIG. 6 and FIG. 7, respectively.

Figure 6:
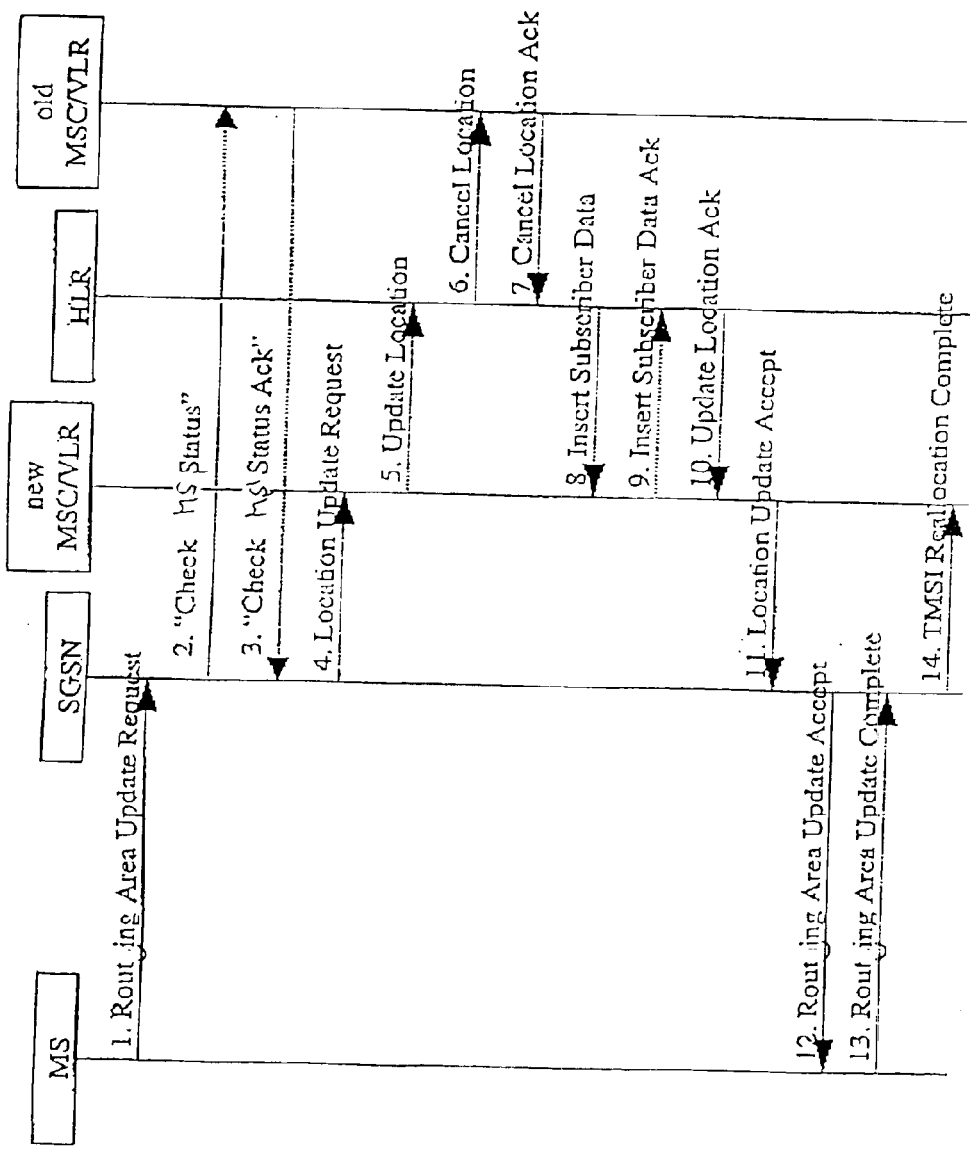
FIG. 6 illustrates querying of an old mobile switching center in the pool for an ongoing circuit switched service for the mobile unit during a change of a serving GPRS support node association at periodic routing area updates according to the present invention.

FIG. 6 shows a change of serving GPRS support node association at periodic routing area updates. The association update is related to a querying of a mobile switching center in the pool for ongoing circuit switched services for the mobile station MS.

As shown in FIG. 6, the update of Gs association at receipt of routing area updates in combination with querying a mobile switching center for ongoing services may be divided into the following sub-steps:

1. A class A mobile station MS supporting both circuit and packet switched services sends a periodic routing area update request message to the serving GPRS support node. This serving GPRS support node checks if the Gs association was established for the mobile station MS. If the association was not established for the mobile station MS, step 12 outlined below would be the next step to perform. Otherwise, if the association was established for the mobile station MS, the serving GPRS support node SGSN derives which mobile switching center MSC the mobile station MS should be connected to. If there is no change in the assignment of the mobile station MS to the mobile switching center MSC, the step 12 outlined below will be the next step to perform. Otherwise, if there is a new assignment between the mobile station MS and the mobile switching center MSC, the next step 2 is performed.

2. The serving GPRS node SGSN has discovered that the association was established for the mobile station MS, and that the IMSI to MSC assignment has changed for the mobile station MS. Therefore, the SGSN sends a message here called "Check MS status" to the old MSC/VLR to check if the mobile station MS is involved in any circuit switched communication. To evaluate the assignment, a mapping table—as discussed above with respect to FIG. 5—is most efficient and at the same time suitably flexible when only some of the IMSI digits (preferably some among the least significant digits, but preferably not the least significant digit which is sometimes fixed to all IMSIs being allocated by a particular operator) are used as entry to the table or algorithm. Therefore, a change in the mapping for one entry will affect all mobile stations MS that have the same index derived from the part of the IMSI parameter that is used as entry to the algorithm.

3. The old mobile switching center MSC/VLR returns a response message, here called "Check MS status Ack", indicating whether or not the mobile station MS is involved in a circuit switched service. If the mobile station MS is involved in a circuit switched service, step 12 will be the next step, and otherwise step 4 will be the next step.

4. If the mobile switching center MSC indicates that the mobile station MS is not involved in a circuit switched service, the serving GPRS support node sends a location update request to the new mobile switching center MSC. This new mobile switching center MSC is selected according to the new IMSI to MSC assignment.

5. The new mobile switching center MSC sends an update location to the home location register HLR.

6. The home location register HLR sends a cancel location to the old mobile switching center MSC.

7. The old mobile switching center MSC returns a cancel location Ack to the home location register HLR.

8. The home location register HLR sends insert subscriber data to the new mobile switching center MSC.

9. The new mobile switching center MSC returns an insert subscriber data Ack to the home location register HLR.

10. The home location register HLR sends an update location acknowledge to the new mobile switching center MSC.

11. The new mobile switching center MSC sends a location update accept to the serving GPRS support node SGSN, and this message contains a new TMSI (temporary mobile subscriber identification) value for the mobile station MS.

12. The serving GPRS support node SGSN sends a routing area update accept to the mobile station MS, and this message contains a new TMSI value for the mobile station MS. The serving GPRS support node SGSN may independently from what is sent for the TMSI used in the circuit switched domain send a new packet type temporary mobile station identification P-TMSI to the mobile station MS in this message.

13. The mobile station MS sends a routing area update complete message to the serving GPRS support node SGSN, confirming that the procedure was successful for the mobile station.

14. The serving GPRS support node SGSN sends a TMSI re-allocation complete message to the new mobile switching center MSC confirming that the procedure was successful.

It should be noted that the querying of the old mobile switching center over the Gs interface may be achieved either using a new pair of messages on the Gs interface or alternatively through an extension of existing Gs messages.

In the following, a further example of the inventive association update will be explained with respect to FIG. 7. According to this example, the mobile station indicates an ongoing circuit switched service in the routing area update message.

According to this example, the process of association update between the serving GPRS support node and the mobile switching center in the pool of mobile switching centers 12 divides into the following substeps:

1. A class A mobile station MS supporting both packet and circuit switched services sends a periodic routing area update request message to the serving GPRS support node, indicating whether or not the mobile station MS is involved in any circuit switched service. If the mobile station MS indicates that it is involved in a circuit switched service, step 10 outlined below will be the next step. Otherwise and if this is not only signaled when the association is established, the serving GPRS support node checks if the association was established for the mobile station MS. If the association was not established for the mobile station MS, step 10 outlined below will be the next step. If the association was established for the mobile station MS, the serving GPRS support node SGSN derives which mobile station center MSC the mobile station MS should now be connected to. Also, when the mobile station MS indicates that it is not involved in a circuit switched service, and this is only signaled when the association is established, the serving GPRS support node derives which mobile switching center MSC the mobile station MS should be connected to. If there is no new assignment between the mobile switching center MSC and the mobile station MS, step 10 listed below will be the next step to be performed. If there is a new assignment, step 2 will be the next step to be performed.

2. The serving GPRS support node discovers that the association was established for the mobile station MS and that the IMSI to MSC mapping has changed for the mobile station MS. Therefore, the serving GPRS support node SGSN sends a location update request to the new mobile switching center MSC. The new mobile switching center MSC is selected from the new IMSI to MSC mapping. Here, a mapping table is most efficient, and at the same time suitably flexible, when only some IMSI digits (preferably some among the least significant bits, but preferably not the least significant digit which is sometimes fixed for all IMSI values being allocated by a particular operator) are used as entry to the mapping table or function. Therefore, a change in the mapping for an entry will affect all mobile stations MS that have the same value for the part of the IMSI parameter that is used as entry to the mapping function.

3. The new mobile switching center MSC sends an update location to the home location register HLR.

4. The home location register HLR sends a cancel location to the old mobile switching center MSC.

5. The old mobile switching center MSC returns a cancel location acknowledgement to the home location register HLR.

6. The home location register HLR sends insert subscriber data to the new mobile switching center MSC.

7. The new mobile switching center MSC returns an insert subscriber data acknowledgement to the home location register HLR.

8. The home location register HLR sends an update location acknowledgement to the new mobile switching center MSC.
9. The new mobile switching center MSC sends a location update accept to the serving GPRS support node SGSN, and this message contains a new TMSI value for the mobile station MS.
10. The serving GPRS support node SGSN sends a routing area accept to the mobile station MS, and this message contains a new TMSI value for the mobile station MS. The serving GPRS support node SGSN may, independent of what is sent for the TMSI used in the circuit switched domain, send a new packet type P-TMSI to the mobile station MS in this message.
11. The mobile station MS sends a routing area update complete to the serving GPRS support node SGSN, confirming that the procedure was successful for the mobile station MS.
12. The SGSN sends a TMSI re-allocation complete message to the new mobile switching center MSC confirming that the procedure was successful.

What is claimed is:

1. A method of updating an association for a mobile unit from a service support node supporting packet switched services to a mobile switching center in a pool of mobile switching centers supporting circuit switched services, comprising the steps:

receiving a routing area update at the service support node from a mobile unit being supported by the service support node;

detecting a new assignment of the mobile unit to a mobile switching center in the pool of mobile switching centers after receipt of the routing area update, wherein said step of detecting an assignment of the mobile unit to a mobile switching center in the pool of mobile switching centers comprises the step of mapping a unique identification of the mobile unit to a mobile switching center in the pool of mobile switching centers according to a pre-specified algorithm, wherein said pre-specified algorithm maps the unique identification of the mobile unit into an index for access to a table storing a relation between the index and a mobile switching center in the pool of the mobile switching centers providing services to the mobile unit; and initiating an association update from the service support node to the mobile switching center assigned to the mobile unit after receipt of the routing area update.

2. The method according to claim 1, wherein said routing area update is a periodic routing area update.

3. The method according to claim 1, further comprising the steps of:

detecting ongoing circuit switched services for the mobile unit after receipt of the routing area update; and, delaying the association update during ongoing services.

4. The method according to claim 3, wherein said step of detecting ongoing services comprises the step of querying the mobile switching center assigned to the mobile unit after receipt of the routing area update for ongoing services.

5. The method according to claim 3, wherein said step of detecting ongoing services comprises the step of evaluating a parameter in a routing area update message indicating ongoing services for the mobile unit.

6. The method according to claim 1, further comprising the step of storing the assignment of the mobile unit to a mobile switching center in the pool of mobile switching centers after receipt of the routing area update in the service support node for subsequent detection of a new assignment for the mobile unit.

7. The method according to claim 1, wherein the service support node is a serving general packet radio service support node.

8. A service support node supporting packet switched services and being associated with a mobile switching center in a pool of mobile switching centers supporting circuit switched services, comprising:

an interface unit adapted to receive a routing area update at the service support node from a mobile unit being supported by the service support node; and a processing unit (74) adapted to:
detect a new assignment of the mobile unit to a mobile switching center in the pool of mobile switching centers after receipt of the routing area update, said assignment being detected by running a pre-specified algorithm, wherein the pre-specified algorithm relies on a unique identification of the mobile unit;

map the unique identification to a mobile switching center in the pool of mobile switching centers, wherein the unique identification of the mobile unit is mapped into an index for access to a table storing a relation between the index and a mobile switching center in the pool of mobile switching centers providing services to the mobile unit; and initiate an association update from the service support node to the mobile switching center assigned to the mobile unit after receipt of the routing area update.

9. The service support node according to claim 8, wherein said processing unit is further adapted to detect ongoing circuit switched services for the mobile unit after receipt of the routing area update and to delay the association update during ongoing services.

10. The service support node according to claim 9, wherein the processing unit detects ongoing services by evaluating a parameter in a routing area update message indicating ongoing services for the mobile unit.

11. The service support node according to claim 8, wherein said processing unit detects ongoing services by querying the mobile switching center assigned to the mobile unit after receipt of the routing area update for ongoing services.

12. The service support node according to claim 8, wherein said service support node comprises a serving general packet radio service support node.

* * * * *